No. 812,933. PATENTED FEB. 20, 1906.
K. KIEFER.
FILTER.
APPLICATION FILED JUNE 30, 1904.
2 SHEETS—SHEET 1.
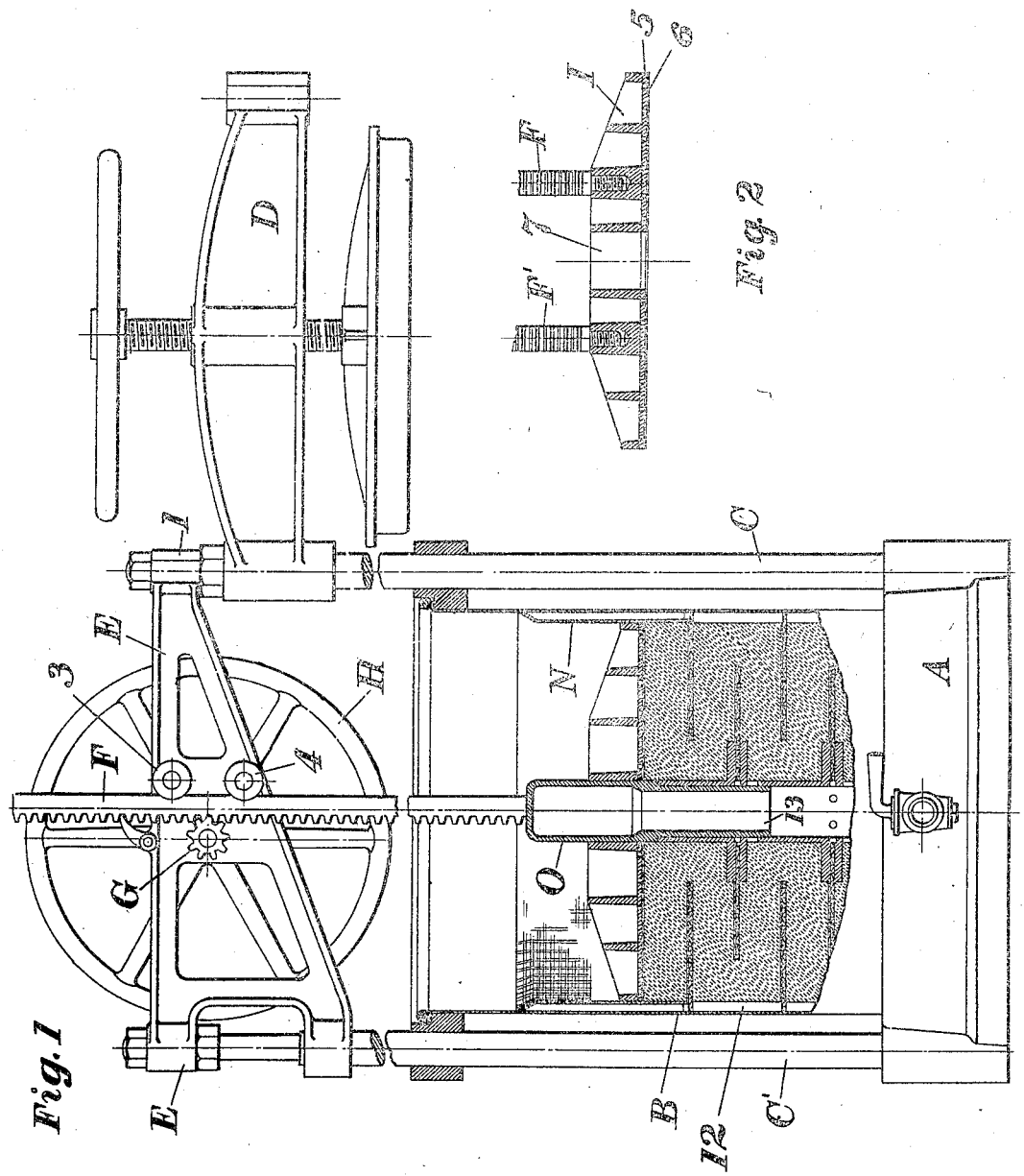

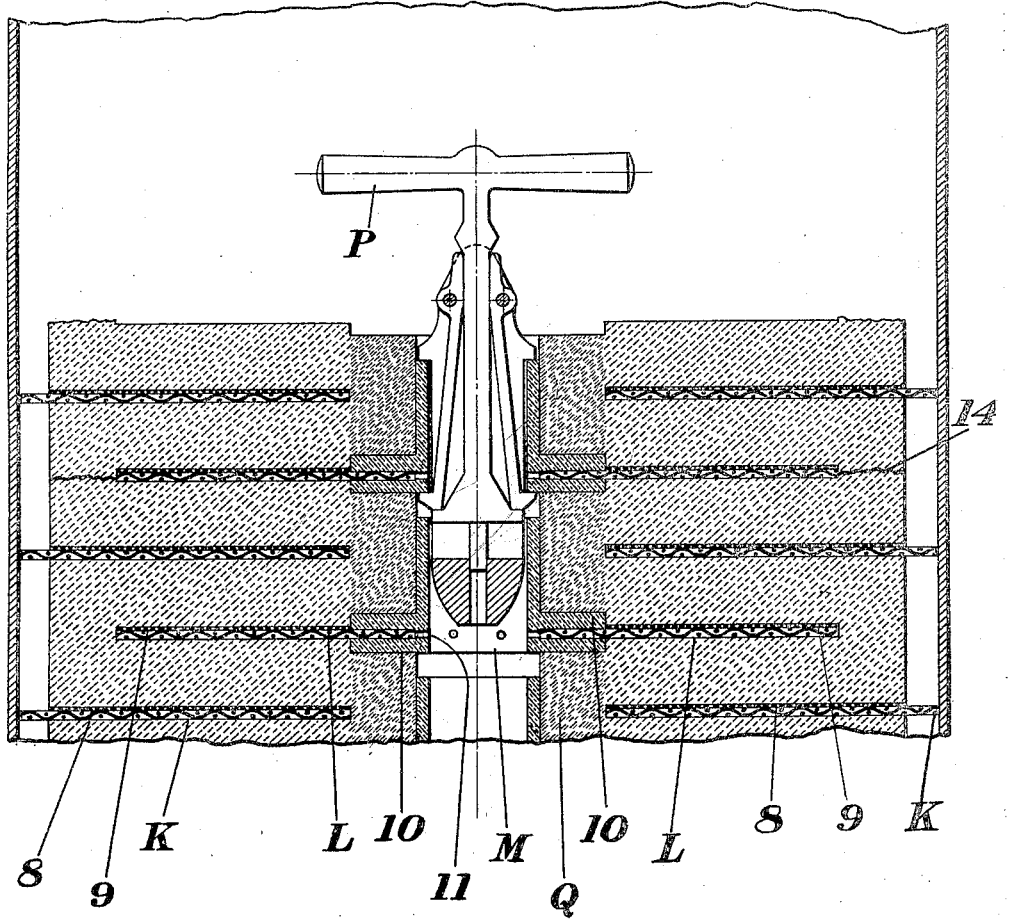

UNITED STATES PATENT OFFICE.

KARL KIEFER, OF CINCINNATI, OHIO.

FILTER.

No. 812,933.

Specification of Letters Patent.

Patented Feb. 20, 1906.

Application filed June 30, 1904. Serial No. 214,733.

*To all whom it may concern:*

Be it known that I, KARL KIEFER, a citizen of the United States, and a resident of Cincinnati, in the county of Hamilton and State of Ohio, have invented new and useful Improvements in Filters, of which the following is a specification.

This invention relates to that class of filters where moist compressed fibrous pulp is used.

In the accompanying drawings, Figure 1 is a cross-section and partial view of the filter. Fig. 2 is a detail of the packing-plate; and Fig. 3 is a cross-section, on an enlarged scale, through several filter elements.

In Fig. 1, A is a base containing an inlet and outlet opening such as used in my Patent No. 782,200, February 7, 1905, Reissue No. 12,347, May 16, 1905. B is a drum inclosing the filter elements. C and C' are upright posts fastened on the base A. D is a swinging yoke suspending the cover of the drum. E is a swinging traverse hinged on the upright posts C', so as to swing out similarly to yoke D. It swings into place hooking onto the upright post C with its part 1, that is cut out one-half. This traverse E carries on both sides a rack F and F', the latter one visible in Fig. 2, and a pinion arrangement G, actuating the racks F and F'. On the same shaft with the pinions is a hand-wheel H. The rack is guided by rollers 3 and 4, which are also in duplicate on each side of the traverse E. Connected to the racks F and F' is a packing-plunger I, with a perforated plate 5, a fine screen 6, and a central hole 7. The inlet liquid-conductors consist of large screens K for the admission of the liquid and are of coarse mesh. They are covered with a finer fiber-retaining screen 8. The outlet liquid-conductors consist of coarse screens of a smaller diameter L, also covered with fiber-retaining screen 9, and a central tubular hub M with flanges 10 gripping the screen L. This hub M may be dispensed with. The screen L connects with the interior of the hub M by the small holes 11. Like in my specification of Patent No. 782,200, February 7, 1905, Reissue No. 12,347, May 16, 1905, the inlet for the cloudy liquid is a very narrow space 12, Fig. 1, produced by the tank B and the filter elements that are somewhat smaller than the tank, while the outlet for the clear liquid is in the center.

The bottom of the tank is covered with the large screen K, and the fiber-retaining screen 8, below which the cloudy liquid enters and above which the first filter layer is packed by means of the packing-piston I, the exterior auxiliary cylinder N, and the interior auxiliary cylinder O. The packing-cylinder N has a diameter somewhat smaller than the tank and may be preforated or not. It is introduced into the tank B and finds a foundation on the top of the screen K. The filter mass is introduced in a state mixed with a good deal of water and then pressed by the piston I and the pressure arrangement above, so that a ring-shaped filter layer is formed between the auxiliary cylinders N and O and the screen-plate and the packing-piston. More pulp should be used at the center, so that the filter layers are more dense at their centers, as indicated by the double section-line. After the first layer is produced an outlet-screen with the hub M is put on top of the first layer. Then the auxiliary cylinder O is introduced, which properly centers the hub M by its lower prolongation 13, which can enter the outlet-opening. Thereupon the second filter layer is produced. After this the auxiliary cylinder N must be taken out of the machine and a screen K inserted, upon which N is to rest again during the formation of the next two filter layers, and so on. The top layer may be solid or with a central hole, such as is known in the art. The filter layers may extend over the tank B, and they may be then compressed by the cover hanging on the yoke D. At the same time the filter is to be closed, similar as in my specification of Patent No. 782,200, February 7, 1905, Reissue No. 12,347, May 16, 1905.

After using the filter it can be taken apart by means of the lifting-tool P, (for which a special patent will be applied,) which catches beneath the hub M and tears the filter layers apart, as indicated by the line of fracture 14. For this purpose the hubs do not touch each other. If it is desired, however, to support the filter centrally by letting the hubs touch each other, this may be done.

The matter described in this specification, but not claimed, is claimed in my application Serial No. 233,647, filed November 21, 1904.

What I claim as new and useful, and desire to secure by Letters Patent, is—

1. In a filter, the combination of a base, a drum rigidly connected to said base, of upright posts fastened onto said base and carrying a packing arrangement and a closing arrangement for the drum, each arrangement adapted to swing out of the way of the other during its use.

2. In a filter, the combination of filter elements built up in the filter, forming a continuous filter layer, means for forming said filter layers and means for removing said filter layers in pairs.

3. In a filter, the combination of an external drum, a series of filter elements connected with each other so as to form one continuous filter mass, and more compressed in the center, with inlet and outlet liquid-conductors.

4. In a filter, the combination of a drum and two upright posts connected to said drum, of a yoke for the purpose of holding down the cover, hinged to one post and locking into the other one, of a press arrangement for the pressing of the filter layer, hinged to the latter post and locking into the previous post, each, yoke and press arrangement, adapted to swing aside during the use of the other one.

5. In a filter, the combination of a drum, of a press arrangement for the purpose of producing a series of filter elements, constituting one continuous filter layer, with a central space-former of a height only part of that of the drum and adapted to be raised as the filter elements are built up and finally extricated.

6. In a filter, the combination of a rigid base, two posts fastened onto such base, a drum mounted upon the base, of a yoke and cover arrangement hinged vertically to one post and locking into the other one, of a press arrangement hinged vertically to the latter post and locking into the previous post, each arrangement adapted to swing aside during the use of the other one.

7. In a filter, the combination of a series of filter layers, interlaced in annular areas and separated outside of such area by liquid-conductors consisting each of one coarse screen and one fine screen, said coarse screen in contact with the lower filter layer, and means for supplying and draining said liquid-conductors.

8. In a filter, the combination of a casing, a series of filter elements interlaced among each other in annular areas, and separated outside of such area by inlet and outlet liquid-conductors, one of the series of conductors communicating with the central opening formed by the said filter layers, and adapted to be gripped by a lifting instrument from above.

9. In a filter, the combination of two filter layers interlaced in an annular area and separated outside of such area by a liquid-conductor, consisting of a metal non-fiber-retaining open-work flat disk and a single metal fiber-retaining screen, the latter in contact with the upper filter layer and the former in contact with the lower filter layer, both metal constructions touching each other, with means of supplying and draining said filter layers.

In testimony whereof I have signed my name to this specification in the presence of two subscribing witnesses.

KARL KIEFER.

Witnesses:
G. W. WERDEN,
H. L. RAMBEAU.